Patented Feb. 2, 1954

2,668,135

UNITED STATES PATENT OFFICE 2,668,135

GERM-COUNTERACTING COMPOSITIONS

John A. Vaichulis, Manteno, and Andrew C. Ivy, Chicago, Ill.

No Drawing. Application May 21, 1949, Serial No. 94,724

14 Claims. (Cl. 167—51.5)

Our invention relates to germ-counteracting compositions, the term "germ-counteracting compositions" being intended to encompass compositions having one or more of the following effects: germicidal, bactericidal, bacteriostatic, antiseptic, prophylactic and like properties. The germ-counteracting compositions of our invention have been found to be unusually effective in the treatment of carriers of typhoid, salmonella, shigella, brucella and in the treatment of infections attributable in the pneumococci, staphylococci and streptococci.

The germ-counteracting compositions of our invention comprise a mixture of ingredients which, in combination, exercise an effect which is in no way predictable from the known properties of the individual ingredients themselves. There is a true synergism as pointed out in more detail below.

In accordance with the particularly preferred aspects of our invention, an antibiotic agent is combined with a bactericidal sulfonamide together with carinamide (4'-carboxyphenylmethanesulfonanilide) and/or sodium benzoate, and with ethyl alcohol, a non-toxic acid, and water to provide a solution within carefully controlled pH limits, as set forth below. Dextrose and sodium chloride are optional ingredients but are particularly desirably utilized. In those cases where the bactericidal sulfonamide is contra-indicated due to an allergy in any particular patient being treated, said sulfonamide may be omitted. However, where its use is possible, it is particularly desirable to employ the same. Other nutrients such as vitamins, minerals and amino acids may also, if desired, be included. In preparing the germ-counteracting compositions, it is most convenient initially to form a solution of all of the aforementioned ingredients, except the antibiotic agent, and then add the antibiotic agent. The aforesaid initially prepared solution exercises a synergistic effect upon the antibiotic and "potentiates" or markedly enhances its normal germicidal activity over and above that which may be due to the germicidal or like properties of the ingredients forming said initially prepared solution. It will be understood, of course, that any other order of mixing the ingredients may be utilized without in any way departing from the principles of our invention.

Prior to our invention, the administration of carinamide in conjunction with penicillin and sulfonamides such as sulfathiazole has been suggested and we make no claim thereto. Our invention, rather, is predicated upon the discovery of certain particular types of germ-counteracting compositions, containing said ingredients and, in addition thereto, other cooperating agents, and the utility of such compositions for the purposes stated above.

The following examples are illustrative of germ-counteracting compositions made in accordance with our present invention. It will be understood that other compositions may be made wherein the proportions are varied, other antibiotic agents are utilized and other changes made without departing from the guiding principles and teachings disclosed herein.

Example 1

| | | |
|---|---|---|
| Penicillin | units | 3,000,000 |
| Carinamide | grams | 24 |
| Sulfamerazine | do | 1.2 |
| Sulfadiazine | do | 2.4 |
| Sulfathiazole | do | 2.4 |
| Ethyl alcohol | cc | 100 |
| 5% dextrose-0.9% sodium chloride solution | liters | 2 |
| Hydrochloric acid (conc.) | cc | 4.3 |

Example 2

| | | |
|---|---|---|
| Penicillin (sodium salt) | units | 10,000,000 |
| Carinamide | grams | 23 |
| Sulfamerazine | do | 1.2 |
| Sulfadiazine | do | 2.4 |
| Sulfamethazine | do | 2.4 |
| Ethyl alcohol | cc | 100 |
| 5% dextrose-0.9% sodium chloride solution | liters | 2 |
| Hydrochloric acid (conc.) | cc | 4.3 |

Example 3

| | | |
|---|---|---|
| Penicillin | units | 15,000,000 |
| Carinamide | grams | 24 |
| Sulfadiazine | do | 3 |
| Sulfathiazole | do | 3 |
| Ethyl alcohol | cc | 100 |
| 5% dextrose-0.9% sodium chloride solution | liters | 2 |
| Hydrochloric acid (conc.) | cc | 4.3 |

Example 4

| | | |
|---|---|---|
| Penicillin | units | 5,000,000 |
| Carinamide | grams | 25 |
| Sulfadiazine | do | 3 |
| Sulfathiazole | do | 3 |
| Ethyl alcohol | cc | 100 |
| Water | liters | 2 |
| Hydrochloric acid (conc.) | cc | 4 |

Example 5

| | | |
|---|---|---|
| Penicillin | units | 15,000,000 |
| Carinamide | grams | 24 |
| Sulfanilamide | do | 6 |
| Ethyl alcohol | cc | 100 |
| 5% dextrose solution | liters | 2 |
| Hydrochloric acid (conc.) | cc | 4.1 |

Example 6

| | | |
|---|---|---|
| Penicillin | units | 8,000,000 |
| Sodium benzoate | grams | 20 |
| Sulfadiazine | do | 2.4 |
| Sulfamerazine | do | 1.2 |
| Sulfathiazole | do | 2.4 |
| Ethyl alcohol | cc | 100 |
| 5% dextrose-0.9% sodium chloride solution | liters | 2 |
| Hydrochloric acid (conc.) | cc | 4.1 |

Example 7

| | | |
|---|---|---|
| Penicillin | units | 3,000,000 |
| Carinamide | grams | 24 |
| Ethyl alcohol | cc | 100 |
| 5% dextrose-0.9% sodium chloride solution | liters | 2 |
| Hydrochloric acid (conc.) | cc | 4.3 |

Example 8

| | | |
|---|---|---|
| Penicillin (sodium salt) | units | 10,000,000 |
| Carinamide | grams | 23 |
| Ethyl alcohol | cc | 100 |
| 5% dextrose-0.9% sodium chloride solution | liters | 2 |
| Hydrochloric acid (conc.) | cc | 4.3 |

Example 9

| | | |
|---|---|---|
| Penicillin | units | 15,000,000 |
| Carinamide | grams | 20 |
| Ethyl alcohol | cc | 200 |
| 5% dextrose-0.9% sodium chloride solution | liters | 2 |
| Hydrochloric acid (conc.) | cc | 4.1 |

In place of penicillin, other antibiotic agents, whether derived from natural sources or synthetically prepared, may be utilized as, for example, the sodium and the potassium salts of penicillin, streptomycin, and aureomycin, and the like. Penicillin (and its salts) are, however, particularly satisfactory in the germ-counteracting compositions of our present invention. It will also be understood that mixtures of any two or more of said antibiotic agents may be utilized in varying proportions in relation to each other.

While any of the bacteriostatic or bactericidal sulfonamides (hereafter called bactericidal sulfonamides) may be employed as, for example, sulfanilamide, sulfathiazole, sulfadiazine, sulfamerazine, sulfamethazine, we find it especially advantageous to utilize two or more thereof in the germ-counteracting compositions of our present invention, as is illustrated more particularly in the foregoing examples.

We find it particularly advantageous to use hydrochloric acid as the non-toxic acid ingredient but other nontoxic acids may be employed as, for example, acetic acid, citric acid, tartaric acid, malic acid and the like.

While the proportions of the several ingredients are somewhat variable, good results are obtained, in general, when the germ-counteracting compositions contain said ingredients in the following ranges of proportions in relation to each other:

| | | |
|---|---|---|
| Antibiotic agent | units | 1–15,000,000 |
| Carinamide and/or sodium benzoate | grams | 18–26 |
| Bactericidal sulfonamide (where utilized) | grams | 4–8 |
| Ethyl alcohol | cc | 8–120 |
| Non-toxic acid | | To adjust to proper pH |
| Dextrose (where utilized) | grams | 80–120 |
| Sodium chloride (where utilized) | grams | 15–20 |
| Amino acids, vitamins and minerals | | To suit daily dosage |
| Water | cc | 1800–2200 |

We have previously pointed out that the pH of the germ-counteracting solutions of the present invention must be carefully controlled within certain limits. Where the compositions utilize penicillin as one of the ingredients, a pH substantially in excess of 7 is destructive to the penicillin and, therefore, the upper pH limit in such compositions as utilize penicillin should not be appreciably in excess of 7. On the other hand, in such compositions, if the pH is below approximately 6.5, precipitation of certain of the ingredients occurs. Accordingly, compositions of this type should be maintained within a pH of about 6.5 and about 7. In the case of germ-counteracting compositions in which antibiotic agents are employed other than penicillin, the upper pH limit will vary somewhat and will be determined, generally speaking, by the upper limit at which the resulting alkalinity is destructive to the antibiotic agents. Still another controlling factor is, of course, the maintenance of a pH within the limits of tolerance by the patient. In general, if the pH of the germ-counteracting compositions is maintained within the range of about 6.5 to about 7, good results are obtained in the utilization of such compositions in accordance with the present invention.

The dosage of the germ-counteracting compositions of our invention is, of course, variable within limits. The several specific examples set forth above comprise amounts which have been effectively used as daily dosages. This amount may be slightly increased or slightly decreased, depending upon the particular condition of the patient and such other factors as may be regarded as significant by the physician in charge of any specific patient afflicted with any of the previously described diseases. The daily dosage is preferably administered over a period of 12 to 24 hours and such administration is done intravenously or intramuscularly, especially intravenously. Therapy with the germ-counteracting compositions of the present invention has been definitely established as being "bactericidal" in accordance with the U. S. Food and Drug Administration Methods of Testing Antiseptics and Disinfectants, Circular No. 198. When blood sera from patients treated with the germ-counteracting compositions of the present invention were tested, as outlined on page 14 of the aforementioned circular, on subculturing, the clear zones of inhibition (E. typhi or S. aureus) were sterile. The effectiveness of the germ-counteracting compositions of our invention in the treatment of typhoid, salmonella and the other diseases mentioned above has been demonstrated on numerous occasions through actual tests.

While the invention has been described in de-

What we claim as new and desire to protect by Letters Patent of the United States is:

1. A germ-counteracting composition comprising an aqueous solution containing penicillin, at least one member selected from the group consisting of carinamide and sodium benzoate; a bactericidal sulfonamide, ethyl alcohol, and a non-toxic acid, said solution having a pH between about 6.5 and about 7.

2. A germ-counteracting composition in accordance with claim 1, wherein the bactericidal sulfonamide comprises at least one member selected from the group consisting of sulfamerazine, sulfadiazine, sulfathiazole and sulfamethazine.

3. A germ-counteracting composition comprising an aqueous solution containing the following ingredients, said solution having a pH falling within the range of 6.5 to about 7: penicillin, sodium benzoate, a bactericidal sulfonamide, ethyl alcohol, and hydrochloric acid.

4. A germ-counteracting composition comprising the following ingredients in substantially the following ranges of proportions in relation to each other:

| | |
|---|---|
| Penicillin units | 1–15,000,000 |
| At least one member selected from the group consisting of carinamide and sodium benzoate grams | 18–26 |
| Bactericidal sulfonamide do | 4–8 |
| Ethyl alcohol cc | 80–120 |
| Dextrose grams | 80–120 |
| Sodium chloride do | 15–20 |
| Non-toxic acid to bring pH within limits of about 6.5 to about 7. | |
| Water cc | 1800–2200 |

5. A germ-counteracting composition comprising the following ingredients in substantially the following proportions in relation to each other:

| | |
|---|---|
| Penicillin units | 1–15,000,000 |
| Sodium benzoate grams | 24 |
| Bactericidal sulfonamide do | 6 |
| Ethyl alcohol cc | 100 |
| Hydrochloric acid cc | 4 |
| Aqueous solution containing 5% dextrose and 0.9% sodium chloride cc | 2,000 |

6. A germ-counteracting composition comprising the following ingredients in substantially the following proportions in relation to each other:

| | |
|---|---|
| Penicillin units | 1–15,000,000 |
| Carinamide grams | 24 |
| Bactericidal sulfonamide do | 6 |
| Ethyl alcohol cc | 100 |
| Hydrochloric acid cc | 4 |
| Aqueous solution containing 5% dextrose and 0.9% sodium chloride cc | 2,000 |

7. A germ-counteracting composition comprising an aqueous solution containing penicillin, at least one member selected from the group consisting of carinamide and sodium benzoate; a bactericidal sulfonamide, ethyl alcohol, dextrose, sodium chloride and a non-toxic acid, said solution having a pH between about 6.5 and about 7.

8. A germ-counteracting composition comprising an aqueous solution containing the following ingredients, said solution having a pH falling within the range of 6.5 to about 7: penicillin, sodium benzoate, a bactericidal sulfonamide, ethyl alcohol, dextrose, sodium chloride and hydrochloric acid.

9. A germ-counteracting composition comprising an aqueous solution containing penicillin, at least one member selected from the group consisting of carinamide and sodium benzoate; ethyl alcohol, and a non-toxic acid, said solution having a pH between about 6.5 and about 7.

10. A germ-counteracting composition comprising an aqueous solution containing the following ingredients, said solution having a pH falling within the range of 6.5 to about 7: penicillin, sodium benzoate, ethyl alcohol, and hydrochloric acid.

11. A germ-counteracting composition comprising the following ingredients in substantially the following ranges of proportions in relation to each other:

| | |
|---|---|
| Penicillin units | 1–15,000,000 |
| At least one member selected from the group consisting of carinamide and sodium benzoate grams | 18–26 |
| Ethyl alcohol cc | 80–120 |
| Dextrose grams | 80–120 |
| Sodium chloride do | 15–20 |
| Non-toxic acid to bring pH within limits of about 6.5 to about 7. | |
| Water cc | 1800–2200 |

12. A germ-counteracting composition comprising the following ingredients in substantially the following proportions in relation to each other:

| | |
|---|---|
| Penicillin units | 1–15,000,000 |
| Carinamide grams | 24 |
| Ethyl alcohol cc | 100 |
| Hydrochloric acid cc | 4 |
| Aqueous solution containing 5% dextrose and 0.9% sodium chloride cc | 2,000 |

13. A germ-counteracting composition, for use with penicillin, said composition comprising an aqueous solution containing at least one member selected from the group consisting of carinamide and sodium benzoate; a bactericidal sulfonamide, ethyl alcohol, and a non-toxic acid, said solution having a pH within the range of 6.5 to about 7.

14. A germ-counteracting composition, for use with penicillin, said composition comprising the following ingredients in substantially the following ranges of proportions in relation to each other:

| | |
|---|---|
| At least one member selected from the group consisting of carinamide and sodium benzoate grams | 18–26 |
| Bactericidal sulfonamide do | 4–8 |
| Ethyl alcohol cc | 80–120 |
| Dextrose grams | 80–120 |
| Sodium chloride do | 15–20 |
| Non-toxic acid to bring pH within limits of about 6.5 to about 7. | |
| Water cc | 1800–2200 |

JOHN A. VAICHULIS.
ANDREW C. IVY.

(References on following page)

References Cited in the file of this patent

UNITED STATES PATENTS

| Number | Name | Date |
|---|---|---|
| 2,118,460 | Currie | May 24, 1938 |
| 2,190,749 | Worne | Feb. 20, 1940 |
| 2,484,174 | Lehr | Oct. 11, 1949 |
| 2,484,175 | Lehr | Oct. 11, 1949 |
| 2,531,367 | Sprague | Nov. 21, 1950 |

OTHER REFERENCES

"Zinsser's Textbook of Bacteriology." Ninth edition, 1948, Appleton-Century-Crofts, New York, page 88.

Rothman, "Principles of Percutaneous Absorption." J. Lab. and Clinical Med., volume 28, 1943, pages 1305–1321, page 1309 considered especially pertinent.

J. A. M. A., November 20, 1948, pages 874 to 877.

J. A. M. A., August 12, 1944, page 1003.

J. A. M. A., November 4, 1944, page 666.

Science, January 24, 1947, pages 94 and 95.

Pros. Soc. Exptl. Biol., and Med., December 1947, page 551.

Journal Bacteriology, January 1945, pages 85 to 95.

Brit. Med. J., January 12, 1946, pages 47 to 50.